United States Patent
Nishimura et al.

(10) Patent No.: US 9,581,073 B2
(45) Date of Patent: Feb. 28, 2017

(54) RADIATOR STRUCTURE FOR TWO-WHEELED VEHICLE

(71) Applicant: HONDA MOTOR CO., LTD., Tokyo (JP)

(72) Inventors: Mai Nishimura, Wako (JP); Daichi Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 14/174,504

(22) Filed: Feb. 6, 2014

(65) Prior Publication Data
US 2014/0238635 A1 Aug. 28, 2014

(30) Foreign Application Priority Data

Feb. 27, 2013 (JP) ................... 2013-037545

(51) Int. Cl.
*B60K 11/04* (2006.01)
*B60K 11/02* (2006.01)
*F01P 3/18* (2006.01)
*F01P 11/12* (2006.01)

(52) U.S. Cl.
CPC .................. *F01P 3/18* (2013.01); *F01P 11/12* (2013.01); *F01P 2050/16* (2013.01)

(58) Field of Classification Search
CPC ......... B60K 11/02; B60K 11/04; B60R 19/52; B60R 2019/525; B62J 17/00; B62K 11/04; F01P 3/18; F01P 11/12; F01P 2050/16
See application file for complete search history.

(56) References Cited

U.S. PATENT DOCUMENTS

| 1,342,191 | A | * | 6/1920 | Thomas | B60K 11/04 180/68.4 |
| 1,860,783 | A | * | 5/1932 | Muir | B60K 11/04 180/68.4 |
| 2,079,327 | A | * | 5/1937 | Linn | B60R 19/52 160/237 |
| 4,169,501 | A | * | 10/1979 | Takeuchi | B60K 11/085 123/41.49 |
| 4,685,530 | A | * | 8/1987 | Hara | B62J 17/00 123/41.27 |
| 5,984,035 | A | * | 11/1999 | Katoh | B62K 11/04 180/229 |
| 2007/0017721 | A1 | * | 1/2007 | Dufresne | B60K 11/04 180/68.6 |
| 2008/0156566 | A1 | * | 7/2008 | Oohashi | B62K 11/04 180/229 |

(Continued)

FOREIGN PATENT DOCUMENTS

JP 7-55292 Y2 12/1995

*Primary Examiner* — Frank Vanaman
(74) *Attorney, Agent, or Firm* — Westerman, Hattori, Daniels & Adrian, LLP (57) ABSTRACT

A radiator structure for a two-wheeled vehicle includes a radiator main body having a front surface positioned to face a running direction, and a radiator grill having a mesh part which is positioned in front of the radiator main body to cover the radiator main body. The radiator grill is positioned behind a front wheel of the two-wheeled vehicle and has a mud guard portion which fills in the mesh part in a region SWF onto which the front wheel is projected as viewed from the front.

5 Claims, 6 Drawing Sheets (56) References Cited

U.S. PATENT DOCUMENTS

| | | | |
|---|---|---|---|
| 2009/0001736 A1* | 1/2009 | Makino | B60Q 5/00 293/115 |
| 2009/0095553 A1* | 4/2009 | Iwanaga | B60K 11/04 180/229 |
| 2009/0108630 A1* | 4/2009 | Nakao | B62K 11/04 296/192 |

* cited by examiner

RADIATOR STRUCTURE FOR TWO-WHEELED VEHICLE

CROSS-REFERENCE TO RELATED APPLICATION

This application claims benefit of priority of Japanese Patent Application No. 2013-037545, filed Feb. 27, 2013.

BACKGROUND OF THE INVENTION

The present invention relates to a radiator structure for a two-wheeled vehicle.

Traditionally, a radiator structure for a two-wheeled vehicle has been well-known (see Japanese Utility Model Publication No. Hei 7-055292) in which a louver is installed on the front surface of a radiator main body (of a radiator, a main body portion that fulfills a function of cooling engine cooling water). A vehicle to which the technique described in Japanese Utility Model Publication No. Hei 7-055292 is applied is an irregular ground traveling vehicle. Such a vehicle has a more sufficient space for positioning the radiator than a two-wheeled vehicle. Thus, in the technique described in Japanese Utility Model Publication No. Hei 7-055292, the radiator is positioned above a front wheel (away from the ground).

SUMMARY OF THE INVENTION

However, the two-wheeled vehicle has a limited space for positioning the radiator, thereby has difficulty to position a radiator above a front wheel in terms of design. For example, for on-road vehicles (leveled-ground traveling vehicles), a radiator is positioned behind the front wheel in some cases. If the radiator is positioned behind the front wheel, the height of the radiator from the ground is small. Therefore, when the traveling speed of the vehicle is high, it is probable that mud and the like thrown up from the front wheel may hit the radiator. Incidentally, in the present specification, "mud and the like" include soil and sand in addition to mud.

A radiator structure for a two-wheeled vehicle can prevent mud and the like thrown up from a front wheel from hitting a radiator main body.

One aspect of the invention is characterized in that in a radiator structure for a two-wheeled vehicle, the radiator structure includes: a radiator main body having a front surface disposed to face a running direction; and a radiator grill having a mesh part which is disposed in front of the radiator main body to cover the radiator main body, the radiator grill is disposed behind a front wheel of the two-wheeled vehicle, and the radiator grill has a mud guard portion which fills in the mesh part in a region onto which the front wheel is projected as viewed from the front.

A second aspect of the invention is characterized in that the radiator grill has a boundary line which sections the radiator grill in a height direction, the boundary line sectioning the radiator grill into an upper radiator grill and a lower radiator grill, and a mesh of the mesh part of the lower radiator grill is finer than a mesh of the mesh part of the upper radiator grill.

A third aspect of the invention is characterized in that the shape of the mesh of the upper radiator grill is a hexagon, and the hexagon is such that a length in a vertical direction is smaller than a length in a vehicle-width direction.

A fourth aspect of the invention is characterized in that the boundary line of the radiator grill has a height roughly equal to that of an axle for the front wheel.

A fifth aspect of the invention is characterized in that the lower radiator grill touches a side cowl covering the side of the two-wheeled vehicle.

According to the first aspect of the invention, even if the two-wheeled vehicle turns a corner at speed, the steering angle of the front wheel is small. Therefore, although the radiator (the radiator main body, the radiator grill and the like) is disposed behind the front wheel, mud and the like which are thrown up from the front wheel when the two-wheeled vehicle runs at high speed are received by the mud guard portion. Consequently, it is possible to prevent the mud and the like from hitting the radiator main body.

According to the second aspect of the invention, the lower radiator grill disposed near the ground can prevent mud and the like from entering the radiator main body from the ground.

According to the third aspect of the invention, the mesh has a hexagonal shape; therefore, the upper radiator grill can be made lightweight and high rigid.

Mud and the like thrown up from the front wheel tend to hit the area of the radiator grill lower than the axle for the front wheel. According to the fourth aspect of the invention, to deal with this, the dimension of the lower radiator grill which relatively takes a lot of trouble with its processing is minimized. Thus, it is possible to prevent mud and the like from entering the radiator main body 81 effectively in terms of cost.

According to the fifth aspect of the invention, the lower radiator grill touches the side cowl; therefore, it is possible to prevent mud and the like from entering the radiator main body from the side.

BRIEF DESCRIPTION OF THE DRAWINGS

The advantages of the invention will become apparent in the following description taken in conjunction with the drawings, wherein:

FIGS. 6(A) and 6(B) illustrate a front view illustrating a mesh part of a radiator grill of the radiator.

DETAILED DESCRIPTION OF THE INVENTION

Figure 1:
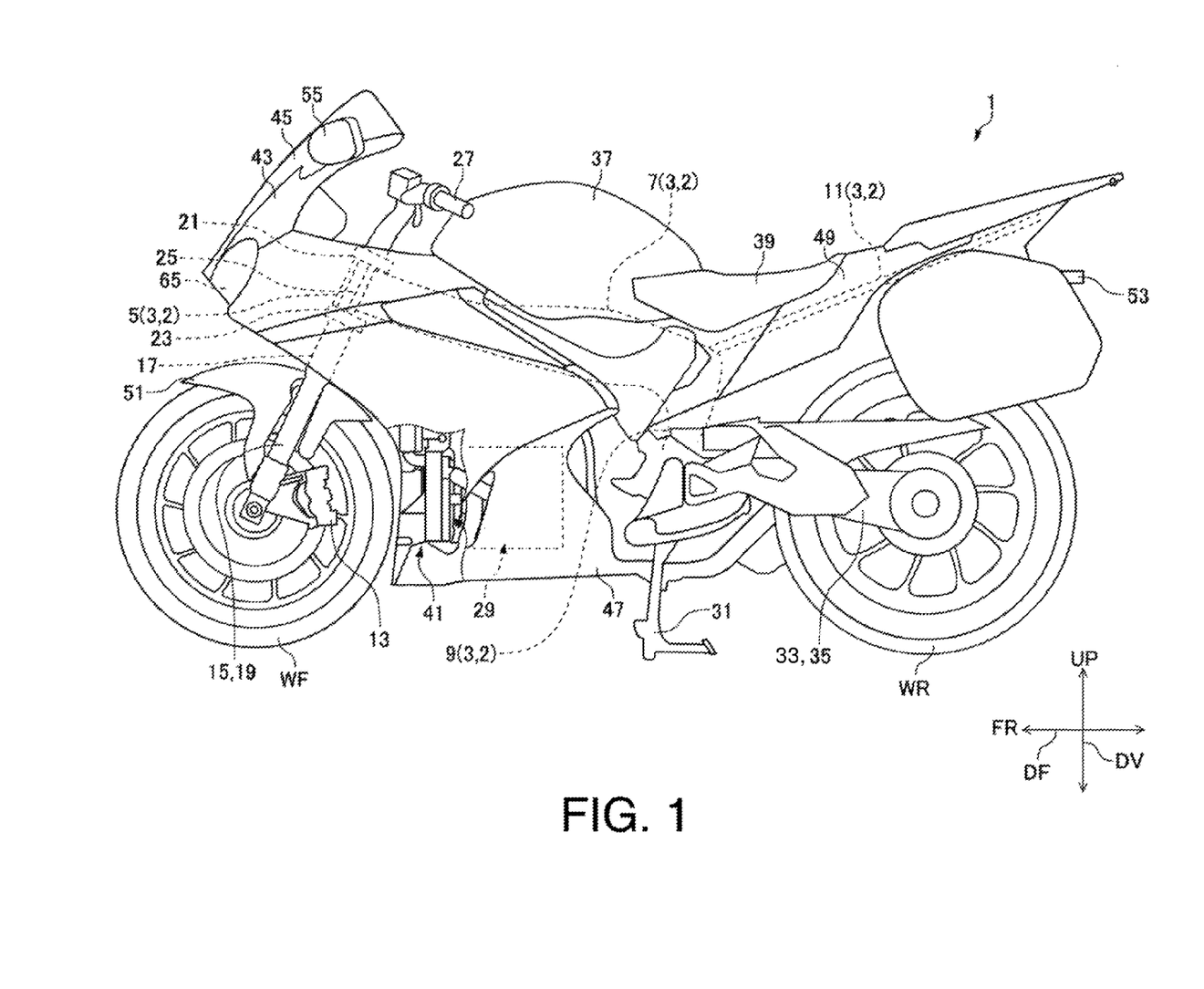
FIG. 1 illustrates a left lateral view of a motorcycle as a two-wheeled vehicle according to an embodiment of the present invention.
Figure 2:
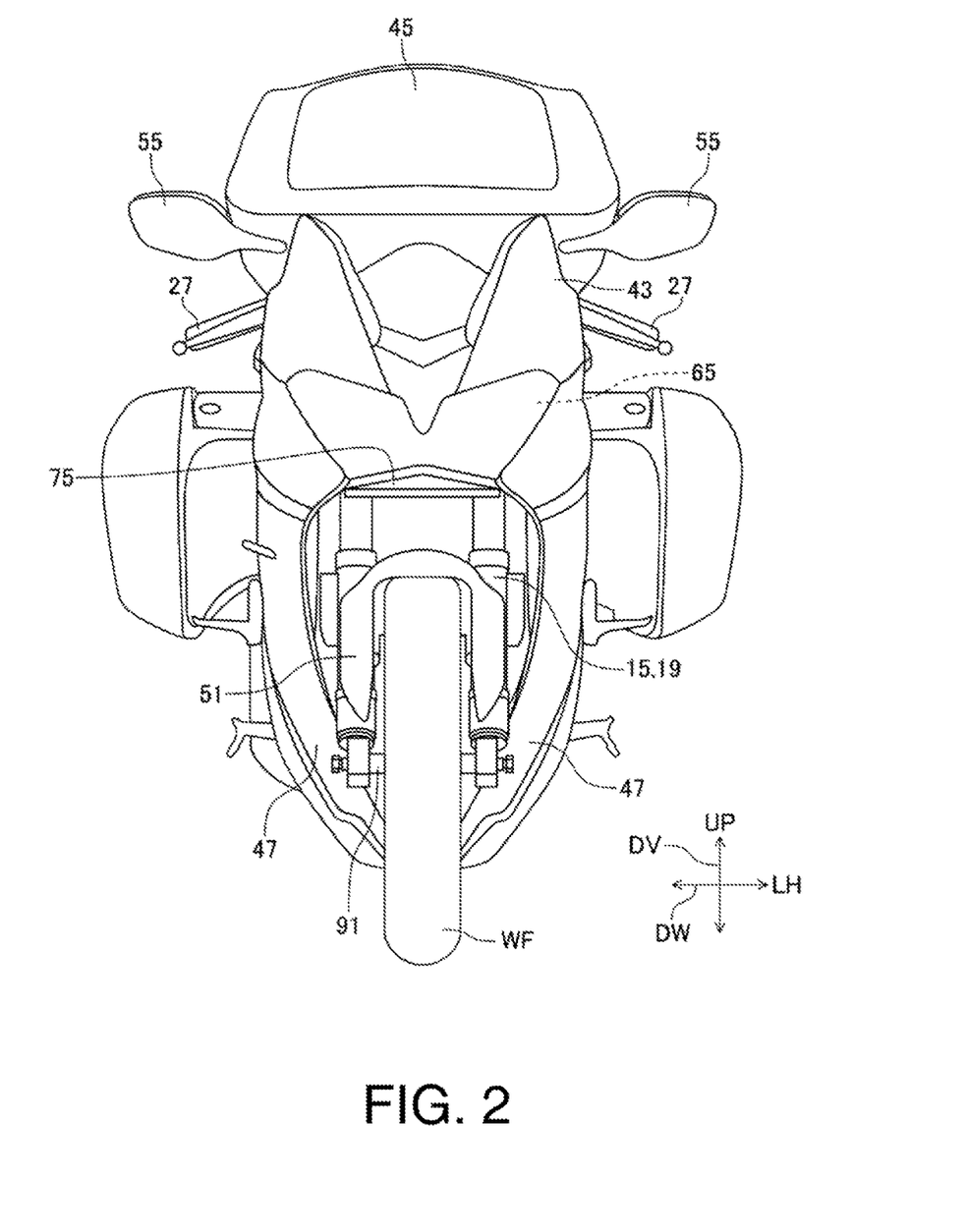
FIG. 2 illustrates a front view of the motorcycle as a two-wheeled vehicle of FIG. 1.

A detailed description of the disclosure will hereinafter be described with reference to the drawings. The overall configuration of a motorcycle 1 as a two-wheeled vehicle according to an embodiment of the present invention is first described with reference to FIGS. 1 and 2. FIG. 1 is a left lateral view illustrating the motorcycle 1 as a two-wheeled vehicle according to the embodiment of the present invention. FIG. 2 is a front view illustrating the motorcycle 1 as a two-wheeled vehicle according to the embodiment of the present invention.

Directions such as front, back or rear, left, right, upside and downside are based on the direction that an occupant (a rider) mounting the motorcycle 1 looks unless otherwise noted. In the figures, arrow "FR" denotes the front of the vehicle, "LH" denotes the left of the vehicle, and "UP" denotes the upside of the vehicle. In addition, symbol "DF" denotes an anteroposterior direction, "DW" denotes a vehicle-width direction and "DV" denotes a vertical direction.

As illustrated in FIG. 1, the motorcycle 1 of the present embodiment mainly includes a vehicle body 2 such as a body frame 3 and the like, a front wheel WF, a rear wheel WR, an engine 29, a fuel tank 37, and a center stand 31.

The body frame 3 includes a head pipe 5, main tubes 7, center tubes 9, and seat rails 11. The main tubes 7 extend obliquely rearward from the head pipe 5. The center tubes 9 extend downward from the rear ends of the main tubes 7. The seat rails 11 extend rearward from the main tubes 7.

The center stand 31 is attached to the lower end portion of the center tube 9 so as to be able to rise and fall so that the center stand 31 can be stored on the lower portion of the vehicle body 2 or stood on the ground. The center stand 31 is configured to be able to stand for supporting the body frame 3.

The front wheel WF is pivotally supported by left and right front forks 19, 19 via an axle 91. The front forks 19, 19 are each composed of an outer tube 15 and an inner tube 17. An upper portion of each inner tube 17 is supported by a top bridge 21 and a bottom bridge 23. A steering stem 25 is inserted into the head pipe 5 at an upper portion of each inner tube 17. The steering stem 25 is connected to the top bridge 21 and the bottom bridge 23. The left and right front forks 19, 19 are provided with respective brake calipers 13, 13. Handlebars 27 installed on the top bridge 21 can steer the front wheel WF.

The engine 29 is a water-cooled engine (an internal combustion engine), which is supported by the main tubes 7 and the center tubes 9. A radiator 41 is installed behind the front wheel WF and in front of the engine 29. The radiator 41 is of an air-cooled type, which cools engine cooling water circulating inside the engine 29. The rear wheel WR is rotatably supported by swing arms 33 coupled to the respective center tubes 9. The rear wheel WR is driven by the power of the engine 29 via a drive shaft 35.

A fuel tank 37 is secured onto the main tubes 7. An oil tank (not shown) is installed inside the fuel tank 37. A seat 39 is secured onto the seat rails 11.

The motorcycle 1 includes a front cowl 43, a headlight 65, a windscreen 45, side cowls 47, a seat cowl 49, a front fender 51 and a rear fender 53. The front cowl 43 is positioned in the front portion of the motorcycle 1 to cover the front portion and the like of the body frame 3. The headlight 65 illuminates the front through the front cowl 43. An air guide passage 75 is opened below the headlight 65. Running-air is introduced toward the head pipe 5 via the air guide passage 75. A rearview mirror 55 is installed on each of the left and right of the front cowl 43. The windscreen 45 is mounted on the upper portion of the front cowl 43. The side cowls 47 are positioned on the sides of the motorcycle 1 to cover the sides of the motorcycle 1 and cover the engine 29 and the like. The seat cowl 49 covers a portion below the seat 39 of the motorcycle 1. The front fender 51 covers the upper portion of the front wheel WF. The rear fender 53 covers the upper portion of the rear wheel WR. The motorcycle 1 is a full-cowling type two-wheeled vehicle.

Figure 3:
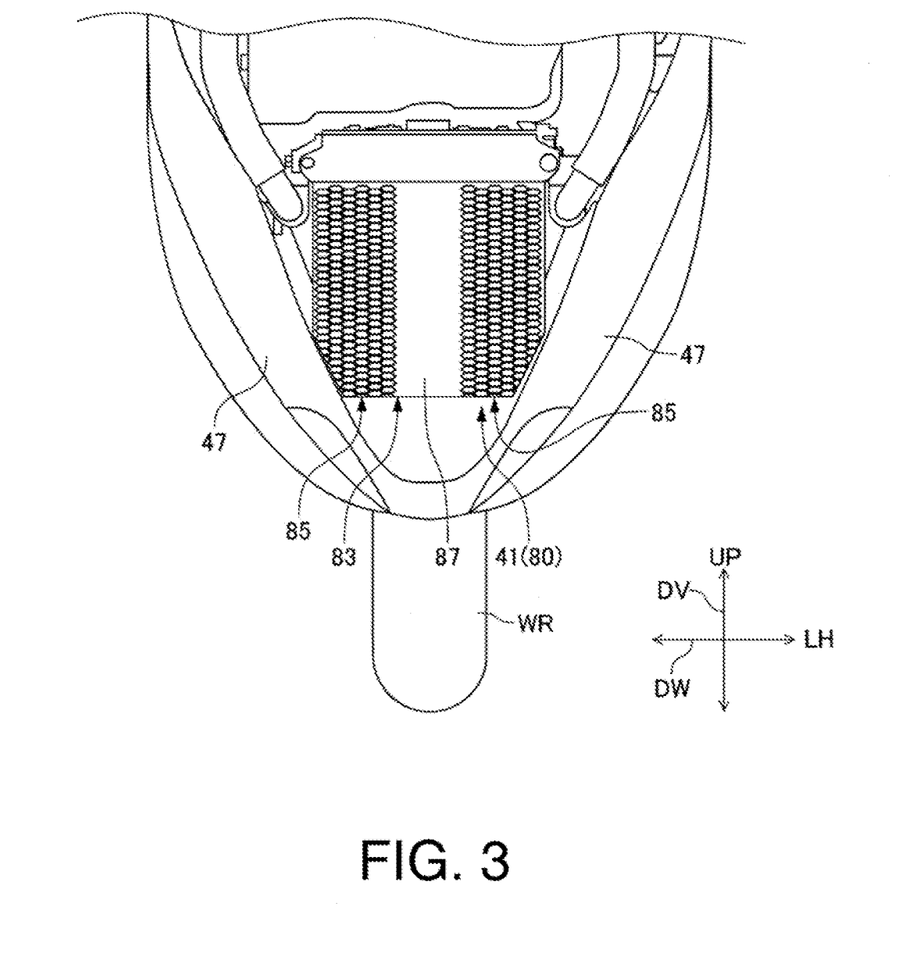
FIG. 3 illustrates a front view of the motorcycle with a front wheel and the like removed.
Figure 4:
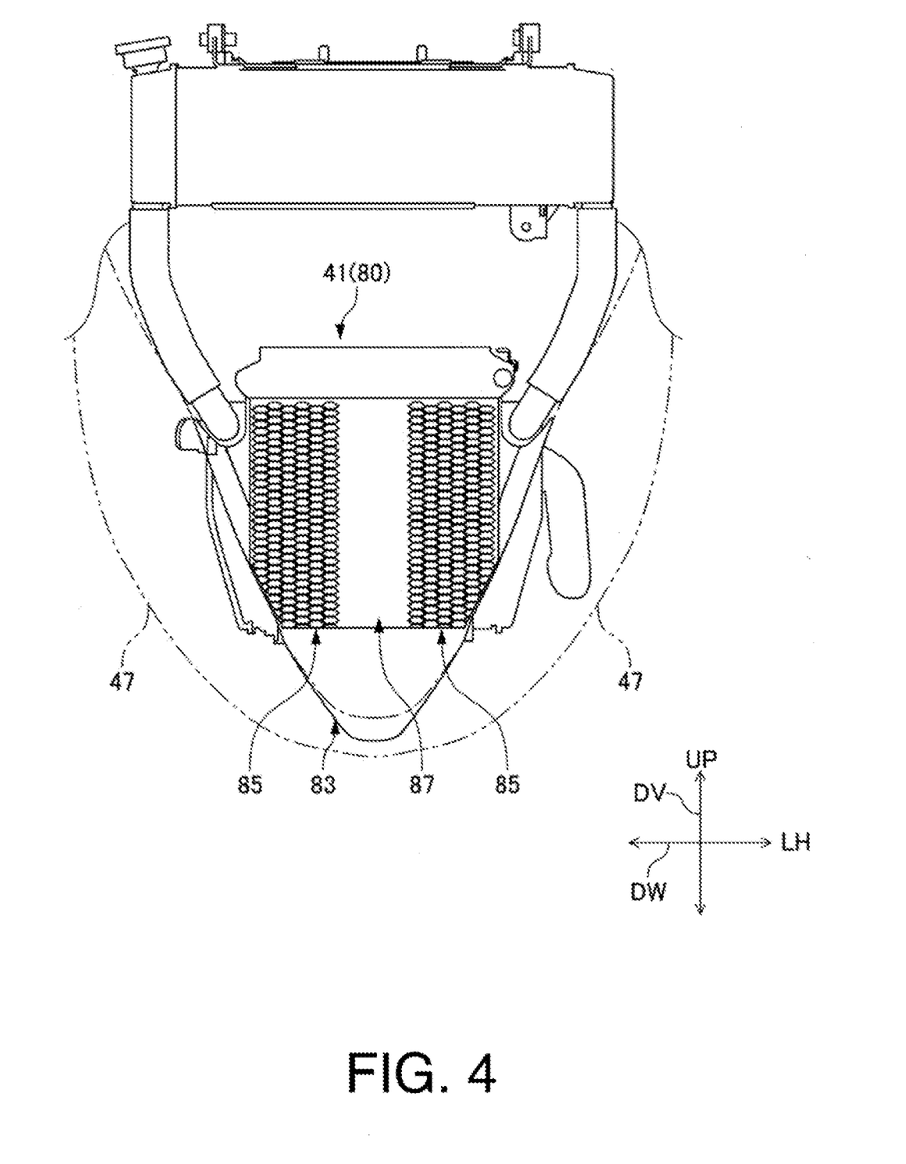
FIG. 4 is a front view of the motorcycle with side cowls of FIG. 3 made transparent.
Figure 5:
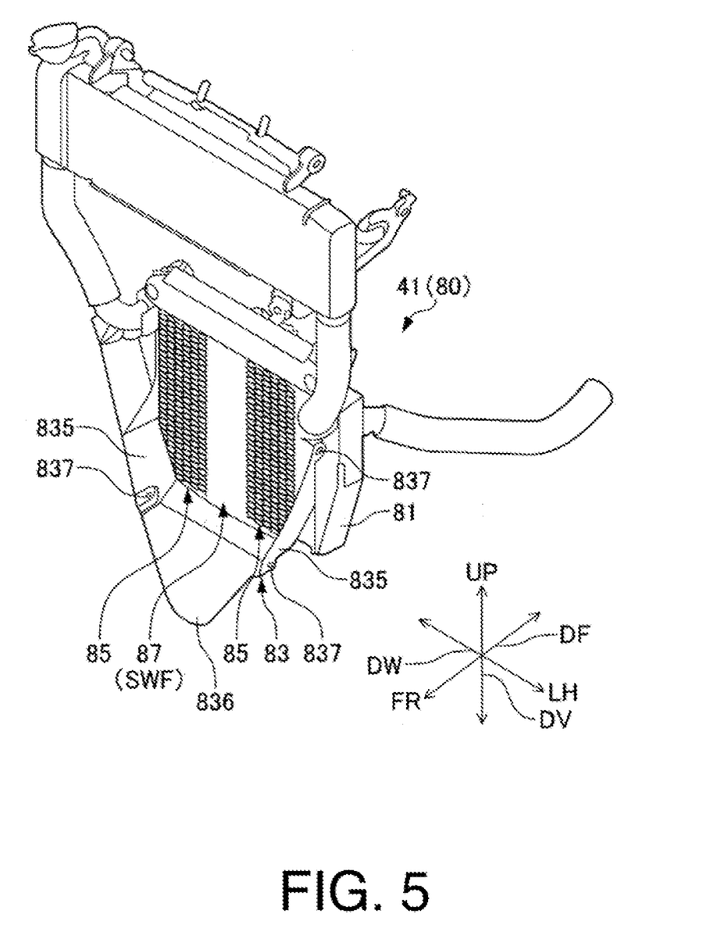
FIG. 5 illustrates a perspective view of a radiator (a radiator structure)
Figure 6A:
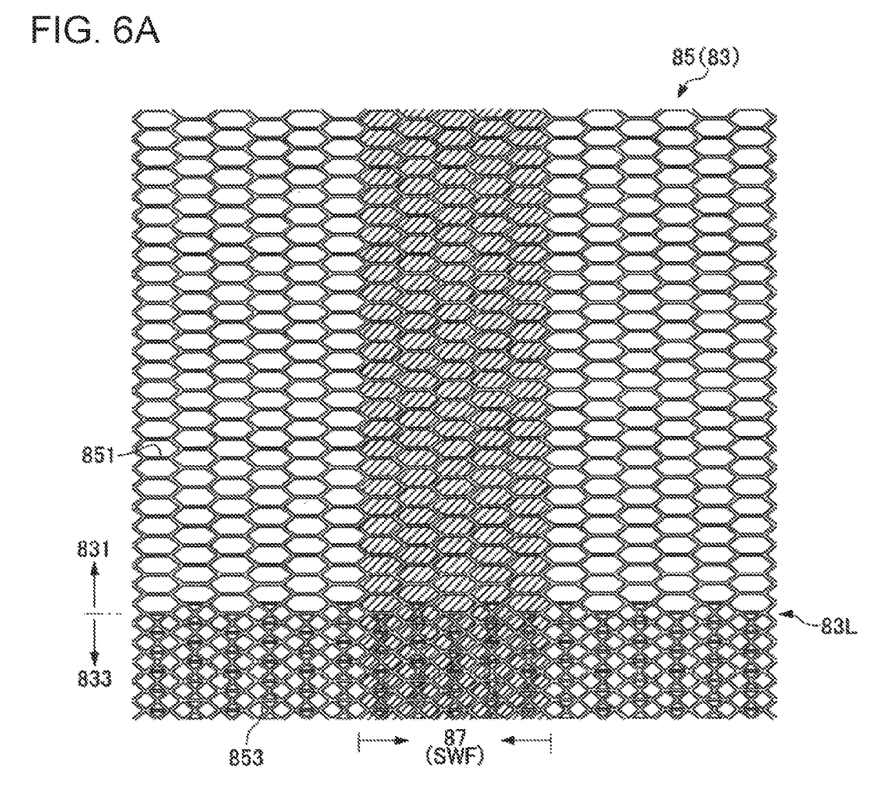
FIG. 6(A) is an overall view.
Figure 6B:
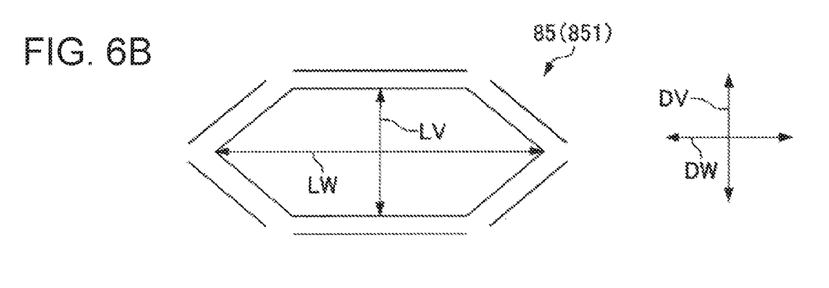
FIG. 6(B) is an enlarged view of a mesh.

A radiator structure 80 for the motorcycle 1 according to the present embodiment is described in detail with reference to FIGS. 3 to 6. FIG. 3 is a front view of the motorcycle 1 with the front wheel and the like removed. FIG. 4 is a front view of the motorcycle 1 with side cowls 47 made transparent in FIG. 3. FIG. 5 is a perspective view of the radiator 41 (the radiator structure 80). FIG. 6 is a front view illustrating a mesh part 85 of a radiator grill 83 of the radiator 41; (A) is an overall view, and (B) is an enlarged view of a mesh 851.

As illustrated in FIG. 1, the radiator structure 80 (the radiator 41) is installed behind the front wheel WF and in front of the engine 29. As illustrated in FIGS. 3 and 4, a large portion, on the front surface side, of the radiator 41 is exposed toward the front via a forward open part between the front end portions of the side cowls 47. In other words, the large portion, on the front surface side, of the radiator 41 faces the front wheel WF.

As illustrated in FIGS. 3 to 5, the radiator 41 includes a radiator main body 81 and a radiator grill 83. Of the radiator 41 the radiator main body 81 is a main body portion which fulfills a function of cooling engine cooling water. The radiator main body 81 is positioned to have a front surface facing a traveling direction. A large portion of the front surface of the radiator main body 81 is covered by the radiator grill 83. The lower corners of the front surface of the radiator main body 81 are covered by the corresponding side cowls 47.

The radiator grill 83 makes it hard for mud and the like thrown up from the front wheel WF to pass therethrough and mainly allows running air to pass therethrough. In other words, the radiator grill 83 prevents mud and the like from entering the radiator main body 81. The radiator grill 83 is positioned behind the front wheel WF and in front of the radiator main body 81. As illustrated in FIG. 5, the radiator grill 83 includes a mesh part 85, side guide walls 835, and a lower guide wall 836.

The mesh part 85 is positioned in front of the radiator main body 81 to cover the large portion of the radiator main body 81. The side guide walls 835 extend forward from the corresponding sides of the mesh part 85. The external surface of the side guide wall 835 faces the inside of the front cowl 43 in a vehicle-width direction DW. The lower guide wall 836 extends forward and downward from the lower portion of the mesh part 85. As illustrated in FIG. 4, the lower end portion of the lower guide wall 836 is positioned behind the lower parts of the front end portions of the side cowls 47.

As illustrated in FIG. 6, the radiator grill 83 has a boundary line 83L which sections it in a height direction (a vertical direction DV). Specifically, the boundary line 83L sections the radiator grill 83 into an upper radiator grill 831 and a lower radiator grill 833. The boundary line 83L of the radiator grill 83 has a height roughly equal to that of the axle 91 (see FIG. 2) for the front wheel WF. Here, "roughly equal" means that a difference between the height of the boundary line 83L and that of the axle 91 for the front wheel WF falls within 10 mm in the vertical direction DV.

As illustrated in FIG. 4, the lower radiator grill 833 touches the side cowls 47. Specifically, the lower radiator grill 833 touches the side cowls 47 at corresponding side guide walls 835. The radiator grill 83 is fastened to the side cowls 47 using through-holes 837 (see FIG. 5) provided in the respective side guide walls 835.

Instead of the fastening of the radiator grill 83 to the side cowls 47, the following configuration may be available. The radiator grill 83 is provided at its upper portion with a U-shaped retaining portion opening downward and the U-shaped retaining portion is used to retain the radiator grill 83 at the upper portion of the radiator main body 81.

As illustrated in FIG. 6, the mesh 853 of the mesh part 85 of the lower radiator grill 833 is finer than the mesh 851 of the mesh part 85 of the upper radiator grill 831. The opening area of the mesh 853 in the lower radiator grill 833 is smaller than that of the mesh 851 in the upper radiator grill 831, preferably by 50% or less.

As illustrated in FIG. 6(B), the mesh 851 in the upper radiator grill 831 has a hexagonal shape. This hexagon is such that two sides located on the upside and downside extend parallel to each other in the vehicle-width direction DW. In addition, the hexagon is such that length LV in the vertical direction DV is smaller than length LW in the vehicle-width direction DW.

As illustrated in FIGS. 3 to 6, the radiator grill 83 has a mud guard portion 87. The mud guard portion 87 is a portion that partially fills in the mesh part 85 in a region (also called "the projection region") SWF onto which the front wheel WF is projected as viewed from the front. The mud guard portion 87 is formed, for example, by forming the mesh part 85 and then filling in a portion of the mesh part 85.

In the present embodiment, the mud guard portion 87 corresponds to the area SWF (see FIG. 6) onto which the front wheel WF is projected.

Incidentally, the mud guard portion 87 may be larger than the projection region SWF. However, if the mud guard portion 87 is excessively larger than the projection region SWF, the opening area of the mesh part 85 becomes too small. Therefore, it is preferred that the area of the mud guard portion 87 be less than 110% of the area of the projection region SWF.

The embodiment of the present disclosure produces the effects as below.

According to the present embodiment, even if the motorcycle 1 turns a corner at speed, the steering angle of the front wheel WF is small. Therefore, although the radiator 41 (the radiator main body 81, the radiator grill 83 and the like) is positioned behind the front wheel WF, mud and the like which are thrown up from the front wheel WF when the motorcycle 1 runs at high speed are received by the mud guard portion 87. Consequently, it is possible to prevent mud and the like from hitting the radiator main body 81.

Further, according to the present embodiment, the lower radiator grill 833 positioned near the ground can prevent mud and the like from entering the radiator main body 81 from the ground.

Still further, according to the present embodiment, the mesh 851 has a hexagonal shape; therefore, the upper radiator grill 831 can be made lightweight and with high rigidity.

Mud and the like thrown up from the front wheel WF tend to hit the area of the radiator grill 83 lower than the axle 91 for the front wheel WF. According to the present embodiment, to deal with this, the dimension of the lower radiator grill 833 which relatively takes a lot of trouble with its processing is minimized. Thus, it is possible to prevent mud and the like from entering the radiator main body 81 effectively in terms of cost.

According to the present embodiment, the lower radiator grill 833 touches the side cowls 47; therefore, it is possible to prevent mud and the like from entering the radiator main body 81 from the side.

The present invention is not limited to the embodiment described above. For example, the shape of the mesh of the mesh part 85 is not limited to a hexagon. The method of forming the mud guard portion 87 is not restrictive.

Although a specific form of embodiment of the instant invention has been described and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A radiator structure for a two-wheeled vehicle, the radiator structure comprising:
    a radiator main body having a front surface positioned to face a running direction; and
    a radiator grill having a mesh part which is positioned in front of the radiator main body to cover the radiator main body, wherein
    the radiator grill is positioned behind a front wheel of the two-wheeled vehicle,
    the radiator grill has a mud guard portion which fills in the mesh part extending from a top of the mesh part to a bottom of the mesh part in a region onto which the front wheel is projected as viewed from the front,
    the mesh part continuously extends laterally across the region onto which the front wheel is projected as viewed from the front, with portions of the mesh part on left and right sides of the mud guard portion unfilled by the mud guard portion,
    the mesh part has a mesh with a hexagon shape,
    the radiator grill has a boundary line which is a portion of the hexagon shape continuously connecting a series of hexagons extending laterally across the mesh part of the radiator grill, the boundary line sectioning the radiator grill in a height direction into an upper radiator grill and a lower radiator grill,
    the mesh of the mesh part of the lower radiator grill is finer than the mesh of the mesh part of the upper radiator grill, and
    the hexagon shape has a length in a vertical direction that is smaller than a length in a vehicle-width direction.

2. The radiator structure for a two-wheeled vehicle according to claim 1, wherein the boundary line of the radiator grill is at a height roughly equal to that of an axle for the front wheel.

3. The radiator structure for a two-wheeled vehicle according to claim 2, wherein the lower radiator grill touches a side cowl covering the side of the two-wheeled vehicle.

4. The radiator structure for a two-wheeled vehicle according to claim 1, wherein the lower radiator grill touches a side cowl covering the side of the two-wheeled vehicle.

5. The radiator structure for a two-wheeled vehicle according to claim 1, wherein the radiator grill is a unitary structure extending from the upper radiator grill into the lower radiator grill, with the mesh part of the lower radiator grill having additional divisions of the hexagon shape defining finer openings than in the mesh part of the upper radiator grill.

* * * * *